(No Model.)
M. S. AYAU.
CENTRIFUGAL DRYING MACHINE.
No. 557,939.
Patented Apr. 7, 1896.
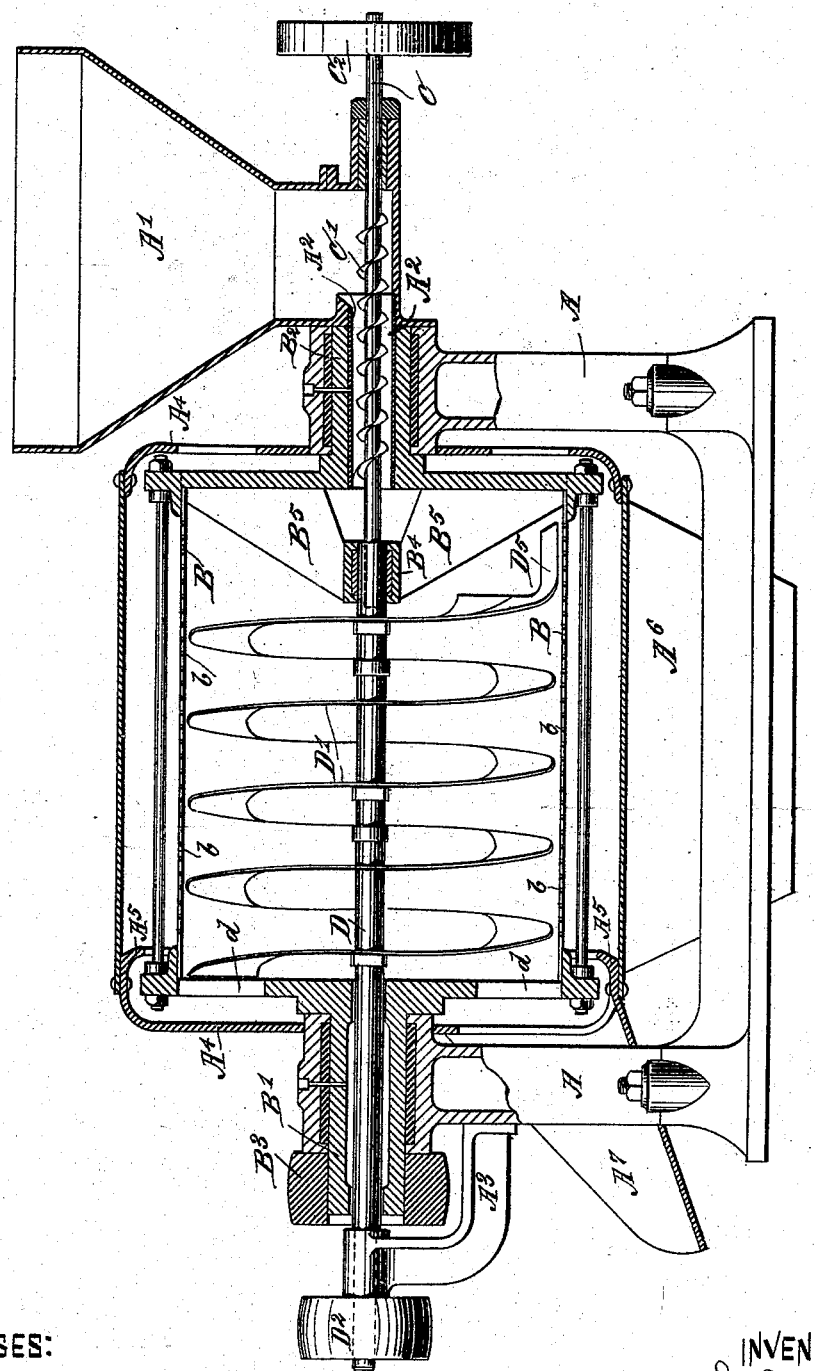
WITNESSES:
Henry T. Hirsch.
M. F. Boyle.
INVENTOR:
Manuel S. Ayau
BY his ATTORNEY:
Thomas Drew Stetson

UNITED STATES PATENT OFFICE.

MANUEL S. AYAU, OF GUATEMALA, GUATEMALA.

CENTRIFUGAL DRYING-MACHINE.

SPECIFICATION forming part of Letters Patent No. 557,939, dated April 7, 1896.

Application filed October 1, 1895. Serial No. 564,326. (No model.)

*To all whom it may concern:*

Be it known that I, MANUEL S. AYAU, of Guatemala city, Guatemala, have invented a certain new and Improved Centrifugal Drying-Machine; and I do hereby declare that the following is a full and exact description thereof.

The invention may be used to treat other loose material, but it is intended more especially for expelling the surplus water from freshly-washed coffee, and I will describe it as thus applied. The drying of coffee by this machine is preparatory to the treatment with warm air in drying, which latter operation, it will be understood, is effected in a separate machine. The coffee-beans come from the washing in a very wet state. I whirl them rapidly in a perforated drum and drive out all the water which can be detached by centrifugal force. I provide means for moving the coffee-grains gradually lengthwise of the perforated drum and means for feeding in the coffee-beans with any quantity of water with which they may be encumbered continuously at one end of the drum, driving off the water by the intense centrifugal force during their slow passage longitudinally of the drum and allowing the beans to escape from the other end.

I effect the movement of the coffee-bean longitudinally along the interior of the rapidly-revolving drum by means of a screw-wing or spiral blade carried on a shaft, which is revolved at a high rate nearly coinciding with that of the drum. The difference in the rotation of the screw and the drum causes the screw to act on the several coffee-grains, moving them gradually and continuously along in the interior of the drum, notwithstanding the energy with which they are held outward by the strong centrifugal force.

I can feed the coffee into the machine at a variable rate, according as its condition or other circumstances shall require. I attain this by making the feeding motion independent of the other motions, so that the feeding can be hastened or retarded independently.

The accompanying drawing forms a part of this specification and represents what I consider the best means of carrying out the invention. It is a central longitudinal section.

Referring to the letters of reference marked thereon, A is a rigid framework, of cast-iron or other suitable material, adapted to support the several parts, and A' is a hopper at one end, in which the coffee may be deposited either continuously or by rapidly-succeeding instalments.

B is a drum having small perforations $b$ along its length and equipped with trunnions B' B², by which it is supported in the framing A. It receives rapid rotatory motion through a pulley B³, which receives a belt (not represented) driven by a steam-engine or other suitable power. One end receives the coffee through a fixed tube A², which extends in a sufficient opening in the interior of the trunnion B². This tube receives the coffee freely at the outer end and delivers it into the interior of the rapidly-revolving drum at the inner end. The feeding in is effected and controlled by a helical wing or screw-thread C', formed on a shaft C, which is mounted in the center of the tube A² and is turned at a proper rate by means of a pulley C² on the overhung outer end, which receives a belt. (Not represented.)

D is a shaft extending longitudinally in the axial line of the drum B and rotated at a nearly but not exactly corresponding rate by means of a pulley D², receiving a belt. (Not represented.) A continuous spiral blade D', having a diameter only a little less than the interior of the perforated drum B, is supported and revolved in such interior by being secured to arms fixed on the shaft D. The spiral may be right-handed or left-handed. The difference in the rate of rotation between the drum B and the spiral blade D' must be in the proper direction to urge the contents of the drum toward the delivery end—the left-hand.

The shaft D is supported at one end by a fixed bearing A³, which is outside of or beyond the pulley B³. The other end of the shaft D is a little within the opposite end of the drum. It is held in a bearing B⁴, which is fixed to and revolves with the drum in its interior. This bearing is carried by oblique arms B⁵, arranged to allow the coffee to fall through the spaces between and accumulate as a concentric layer in the interior of the drum. The disposition of the coffee to adhere by centrifugal force to the interior of the drum is overcome by the action of the spiral blade D', which acts screwwise to urge it constantly forward from the receiving end toward the delivery end, thus allowing the material to be received continuously and to be delivered continuously, treating a large quantity of coffee thoroughly and effectively in a short time.

A lip $A^5$ may extend around in the interior of the casing $A^4$ in the position indicated to insure a more complete separation of the coffee from the water, as both are delivered tangentially within the casing.

A large proportion of the water will be driven out immediately on the material being received and caused to rotate with the drum. I provide a scraper $D^5$ at that end of the spiral blade, which insures that the material shall be agitated and started on its journey longitudinally of the machine. The successive spirals of the blade continue the movement of the coffee, and on its reaching the delivery end of the machine it is discharged through the apertures $d$.

The casing $A^4$ is of sheet metal or other suitable material adapted to receive the drops of water which are discharged tangentially from the perforated body of the drum and to allow such water to trickle down. It is discharged at the bottom through a spout $A^6$. The several coffee-beans as they are expelled from the delivery end of the casing may also fly out tangentially, and, being arrested by a corresponding portion of the inclosing casing, lose their rotatory velocity and drop down and are discharged through an inclined spout $A^7$, to be subsequently treated by a Ribon drying-machine or in any other desired manner to complete the drying.

The bearing for the inner end of the feed-shaft C is formed by boring a hole of the proper size in the end of the shaft D, as shown by dotted lines. The construction provides a liberal space between the oblique arms $B^5$ for the reception of the coffee into the interior of the drum and causes it to move outward immediately, so as to strike the interior surface of the drum at the entering end and to be treated by the centrifugal force in traversing the whole length of the interior.

The tube $A^2$ extends quite through the bearing and prevents the coffee from being rotated until it has passed completely within the machine. The screw-thread C' on the shaft C may be extended still farther inward, if desired.

Modifications may be made without departing from the principle or sacrificing the advantages of the invention.

I have shown the drum ends as cast-iron and the cylindrical portion as boiler-iron perforated. I have shown the bearings for the trunnions as babbitted. But all these details may be varied.

I have shown the casing $A^4$ as provided with liberal openings, which allow the circulation of air. The water-discharge spout $A^6$ may deliver a current of air generated by the centrifugal force. I have shown tie-bolts outside of the drum, holding the heads very firmly at the proper distance apart. These bolts serve to some extent as wings to promote the driving of air outward through the water-delivery spout.

I claim as my invention—

1. In a centrifugal drying-machine, the horizontal perforated drum and means for revolving it rapidly, in combination with provisions for feeding in the material at one end and delivering it continuously at the other end, and with a shaft in its interior revolved relatively thereto, a spiral blade carried on such shaft for urging the material longitudinally in such drum by such revolution, and also a scraper $D^5$ carried by such shaft and extending horizontally beyond the end of such spiral close to the inner surface of the drum, all arranged for joint operation substantially as herein specified.

2. In a centrifugal drying-machine, the perforated drum and means for revolving it, in combination with the hopper A', tube $A^2$ in line with the axis of the drum and feeding-screw C, C', with its driving means $C^2$ independent of the motion of the main shaft for supplying the loose material to be dried, and the main shaft D with its spiral blade D' and scraper $D^5$ and means for turning it at a rate differing slightly from that of the drum to urge the material longitudinally in such drum, all arranged for joint operation substantially as herein specified.

3. In a centrifugal drying-machine, the perforated drum and means for revolving it, in combination with provisions for feeding in the material at one end and delivering it continuously at the other end, and with a shaft mounted concentrically within the drum and revolved at a slightly different rate, a spiral blade carried on such shaft for urging the material longitudinally in such drum, a scraper $D^5$ extending beyond the end of such shaft and adapted to dislodge the material and prepare it to be acted on by the spiral blade, a concentric bearing formed in its end receiving the inner end of the feed-screw shaft C and serving as a bearing therefor and a casing $A^4$ inclosing the drum and having a lip $A^5$ arranged to insure the separation of the water from the dried material after both have been ejected, and two spouts $A^6$ and $A^7$, adapted the one to deliver the relatively-dried material through one channel and the other to deliver the exuded water through the other channel, all arranged for joint operation substantially as herein specified.

4. In a centrifugal drying-machine, the perforated drum B, and means $B^3$ for revolving it, and having the bearing-support $B^4$ carried by oblique arms $B^5$ within the said drum, in combination with the shaft D with its spiral blade D' and means $D^2$ for turning it to urge the material longitudinally in such drum, and with the hopper A′, tube A², and feeding-screw C, C′, having a bearing in the end of the shaft D and having independent driving means C² for supplying the loose material, all arranged for joint operation substantially as herein specified.

In testimony that I claim the invention above set forth I affix my signature in presence of two witnesses.

MANUEL S. AYAU.

Witnesses:
CHARLES S. WINTER,
J. J. HERBHY.